US006772362B2

(12) United States Patent
Forbes et al.

(10) Patent No.: US 6,772,362 B2
(45) Date of Patent: Aug. 3, 2004

(54) SYSTEM FOR DISTRIBUTING CLOCK SIGNAL WITH A RISE RATE SUCH THAT SIGNALS APPEARING AT FIRST AND SECOND OUTPUT TERMINALS HAVE SUBSTANTIALLY NO SIGNAL SKEW

(75) Inventors: Leonard Forbes, Corvallis, OR (US); Kie Y. Ahn, Chappaqua, NY (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/365,546

(22) Filed: Feb. 13, 2003

(65) Prior Publication Data

US 2003/0163751 A1 Aug. 28, 2003

Related U.S. Application Data

(63) Continuation of application No. 09/385,379, filed on Aug. 30, 1999, now Pat. No. 6,539,490.

(51) Int. Cl.[7] .............................. G06F 1/06; G06F 1/10
(52) U.S. Cl. ....................................... 713/503; 327/141
(58) Field of Search ................................ 713/400, 401, 713/500, 503; 327/141; 375/257, 258

(56) References Cited

U.S. PATENT DOCUMENTS

| | | |
|---|---|---|
| 5,086,500 A | 2/1992 | Greub |
| 5,517,532 A | 5/1996 | Reymond |
| 5,767,715 A | 6/1998 | Marquis et al. |
| 5,861,764 A | 1/1999 | Singer et al. |
| 5,867,432 A | 2/1999 | Toda |
| 5,944,836 A | 8/1999 | Edahiro |
| 5,974,560 A | 10/1999 | Hotta et al. |
| 6,098,176 A * | 8/2000 | Coteus et al. ................ 713/400 |
| 6,219,384 B1 * | 4/2001 | Kliza et al. .................. 375/258 |

OTHER PUBLICATIONS

*Edelstein et al., "Full Copper Wiring in a Sub–0.25 $\mu$m CMOS ULSI Technology", Tech. Digest of 1997 IEDM, pp. 773–776.
*Venkatesan et al., "A High Performance 1.8V, 0.20 $\mu$m CMOS Technology with Copper Metallization", Tech. Digest of 1997 IEDM, pp. 769–772.
*Matsuura et al., "A Highly Reliable Self–Planarizing Low–k Internal Dielectric for Sub–quarter Micron Interconnects", Tech. Digest of 1997 IEDM, pp. 785–788.
*Aoki et al., "A Degradation–Free Cu/HSQ Damascene Technology Using Metal Mask Patterning and Post–CMP Cleaning by Electrolytic Ionized Water", Tech. Digest of 1997 IEDM, pp. 777–781.
*Rabaey, "Digital Integrated Circuits", A Design Perspective, Prentice Hall Electronics and VSLI Series 1996, pp. 482–493.

* cited by examiner

*Primary Examiner*—Jeffrey Gaffin
*Assistant Examiner*—Thuan Du
(74) *Attorney, Agent, or Firm*—Dickstein Shapiro Morin & Oshinsky LLP

(57) ABSTRACT

The present invention provides a method and apparatus, for integrated circuits, that is able to generate clock signals at different destination points with little or no clock signal delay or skew. A slow rising input clock signal is propagated across a low loss transmission line. The slow rising input signal creates a region of substantially no clock signal delay between the signal at the beginning of the low loss transmission line and the signal at the end of the low loss transmission line. Comparators are used to compare the signals at the beginning and end of the low loss transmission lines and compare them to a reference signal. The compared signals are sampled during the region of substantially no clock signal delay or skew. The sampled clock signals with substantially no delay are sent to local destination points or other low loss transmission lines within the integrated circuit to transmit the signal to remote destination points.

27 Claims, 15 Drawing Sheets

SYSTEM FOR DISTRIBUTING CLOCK SIGNAL WITH A RISE RATE SUCH THAT SIGNALS APPEARING AT FIRST AND SECOND OUTPUT TERMINALS HAVE SUBSTANTIALLY NO SIGNAL SKEW

CROSS REFERENCE TO RELATED APPLICATIONS

The present application is a continuation application of U.S. patent application Ser. No. 09/385,379, filed on Aug. 30, 1999, now U.S. Pat. No. 6,539,490, the disclosure of which is herewith incorporated by reference in its entirety.

FIELD OF THE INVENTION

This invention relates to integrated circuit chips, in particular, to a method and apparatus capable of reducing clock signal skew in an integrated circuit, between integrated circuits, and between integrated circuits and other circuits.

BACKGROUND OF THE INVENTION

The timing of a microprocessor based circuit is controlled by one or more clock signals. A clock signal includes periodic transitions between high and low logic levels at high frequency. Early personal computers operated using clock signals with a frequency near 5 MHz, but current implementations use numerous clock sources with frequencies increasing towards 10 GHz.

The clock signal in a computer system is used for many purposes including to synchronize bus cycles in the system. Thus, all digital components in the computer system initiate data operations based upon the clock signal. Clock signals usually are generated by clock circuits and these clock circuits can be within an integrated circuit or fabricated on a printed circuit board. Microprocessor based circuits are often complex and include numerous electrical components, many of which are driven by a clock signal.

Referring to FIG. 1, a typical clock circuit 1 includes an oscillator circuit 2, which is typically crystal controlled, which is coupled to a clock buffer circuit 4. The oscillator circuit 2 generates a periodic signal at a predetermined frequency. A clock buffer circuit 4 receives the periodic signals from oscillator circuit 2 and generates multiple output clock signals. The output clock signals are produced by output buffers within clock buffer circuit 4. The clock signals are sent to multiple destination points D1, D2, D3, and D4 within an integrated circuit. The clock signals are then used to drive circuit components located at various sites across the integrated circuit.

Although occurring extremely rapidly, electrical signals require a finite amount of time to travel from one point to another on a circuit board. The longer the distance through which a signal must travel, the more time it takes for that signal to propagate the required distance. Conductive copper, or other conductive metal pathways, commonly called traces, are fabricated in an integrated circuit to provide conductive paths for signals to travel from one component to another. The length of the trace lengths between the output resistors Ro, of the clock buffer, and the various destination points often differs. For example, if the distance between resistor Ro and destination point D2 is shorter than the distance between resistor Ro and D4, it will take a clock signal longer to propagate to destination point D4 than D2. Thus, if the multiple clock signals are in phase at resistors Ro, and each destination point has a different associated trace length, then the clock signals arriving at the different destination points will be out of phase. This phase difference typically is referred to as clock skew.

Several attempts have been made to correct or reduce clock skew or delay. One technique, attempts to modify a circuit layout by adding additional trace length to the faster clock signal traces, to slow down the faster clock signals, so that all of the clock signals arrive substantially in phase at the destination points. However, this process is time consuming and expensive because of the extensive testing, fabrication, and subsequent modifications to form precise trace lengths to compensate for the clock signal skew. Another way to correct or reduce clock skew is to run the clock signals through delay circuits and adjust the delays for respective clock signals so that all clock signals arrive at their destination substantially in phase, which requires additional circuitry and delay "tuning".

The problem with these attempts is that while they do mitigate clock skew to some extent, they fail to adequately address the effects caused by the inductance of the transmission lines. As advancing technologies increase line lengths and device switching speeds, the inductance effects of the transmission line starts to dominate the clock signal delay behavior. Therefore, to adequately address the problem of clock signal skew, the inductive transmission line effects must also be considered.

FIG. 2 illustrates a clock signal pathway which incorporates a signal source 5, a source output impedance Zs, and a low loss transmission line 6. The low loss transmission line 6 has an overall impedance Zo shown as line resistance $R_L$, inductance $L_L$, and capacitance $C_L$. The low loss transmission line 6 begins at node N2 and terminates at node N3. Connected to node N3 is a termination line with a small capacitance $C_s$.

As seen in FIG. 2, the voltage at node N1, is simply the input voltage which we will refer to as clock signal V1. The clock signal V1 is generated with an input source impedance Zs and is propagated to node N2. The signal at node N2 is divided due to the series connection of the source impedance Zs and the line impedance Zo. The signal at node N2 is V2. Signal V2 travels down the low loss transmission line 6 to node N3. Since there is a termination with a small capacitance $C_s$ connected to the low loss transmission line 6 the signal is reflected back through node N3. The signal V3 at node N3 is therefore double the initial value of V2 because the reflected signal is added to the incoming signal. The reflected signal is then sent back to N2 where it is also added to V2. Ultimately, the reflected signal travels to the source impedance Zs. Since the source impedance Zs is equal to the line impedance Zo there is no further reflection at the N2 end.

FIG. 3, is a graphical illustration of the input signal V1, the signal V2 at node N2, and the signal V3 at node N3 for a typical fast rising clock signal transmitted through the circuit in FIG. 2. The input clock signal V1 rises at a fast rate, 0 volts to 5 volts in about 10 pico-seconds (ps). The voltage V2 rises at half the rate of V1 because the V1 signal is divided at N2, as discussed above. The signal V2 levels off at a voltage of 2.5 Volts which is the point when V1 stops increasing, 5 Volts, this is indicated by the point B on the V2 line. The clock signal V3, rises at twice the rate as V2 because the reflected signal from the small capacitance termination end is added to the incoming signal at N3. The reflected signal is also sent back and finally reaches N2, represented as point A on the graph which then causes the signal V2 to rise at the same rate as V1 and V3.

As can be seen from FIG. 3, the first delay time T1, represents the time for signal V2 to propagate down the low loss transmission line 6 from node N2 to the node N3, where V3 starts, is about 40 ps. The second delay time T2, represent the time for the reflected signal to travel back across the low loss transmission line 6 from node N3 to node N2 which is also about 40 ps. Therefore, the total clock signal skew between V2 and V3 is the time it takes for the clock signal to travel down the low loss transmission line 6, from N2 to N3, a total of about 40 ps. On FIG. 3 the total skew is represented by the time of the first delay time T1. A skew this big or bigger is typical for a fast rising input clock signal along a low loss transmission line.

This type of clock skew is typically not addressed by conventional signal skew adjusting circuits.

SUMMARY OF THE INVENTION

The problems outlined above are in large part solved by the invention which reduces skew between clock signals by using low loss transmission lines in conjunction with a slow rising input clock signal.

As will be discussed in further detail below, when a slow rising clock signal is used in conjunction with a low loss transmission line 6 a period of time or region of no apparent skew or delay exists between the clock signals at the input and destination ends of the low loss transmission line 6. The signals with no apparent skew or delay can be used to operate various components within an integrated circuit.

The foregoing and other features and advantages of the invention will be more clearly understood from the following detailed description of the invention which is provided in conjunction with the accompanying drawings.

DETAILED DESCRIPTION OF THE PREFERRED EMBODIMENTS

Preferred embodiments of the present invention will now be described in conjunction with FIGS. 2–13. Other embodiments may be utilized and structural or logical changes may be made to the described embodiments without departing from the spirit or scope of the present invention.

Figure 3:
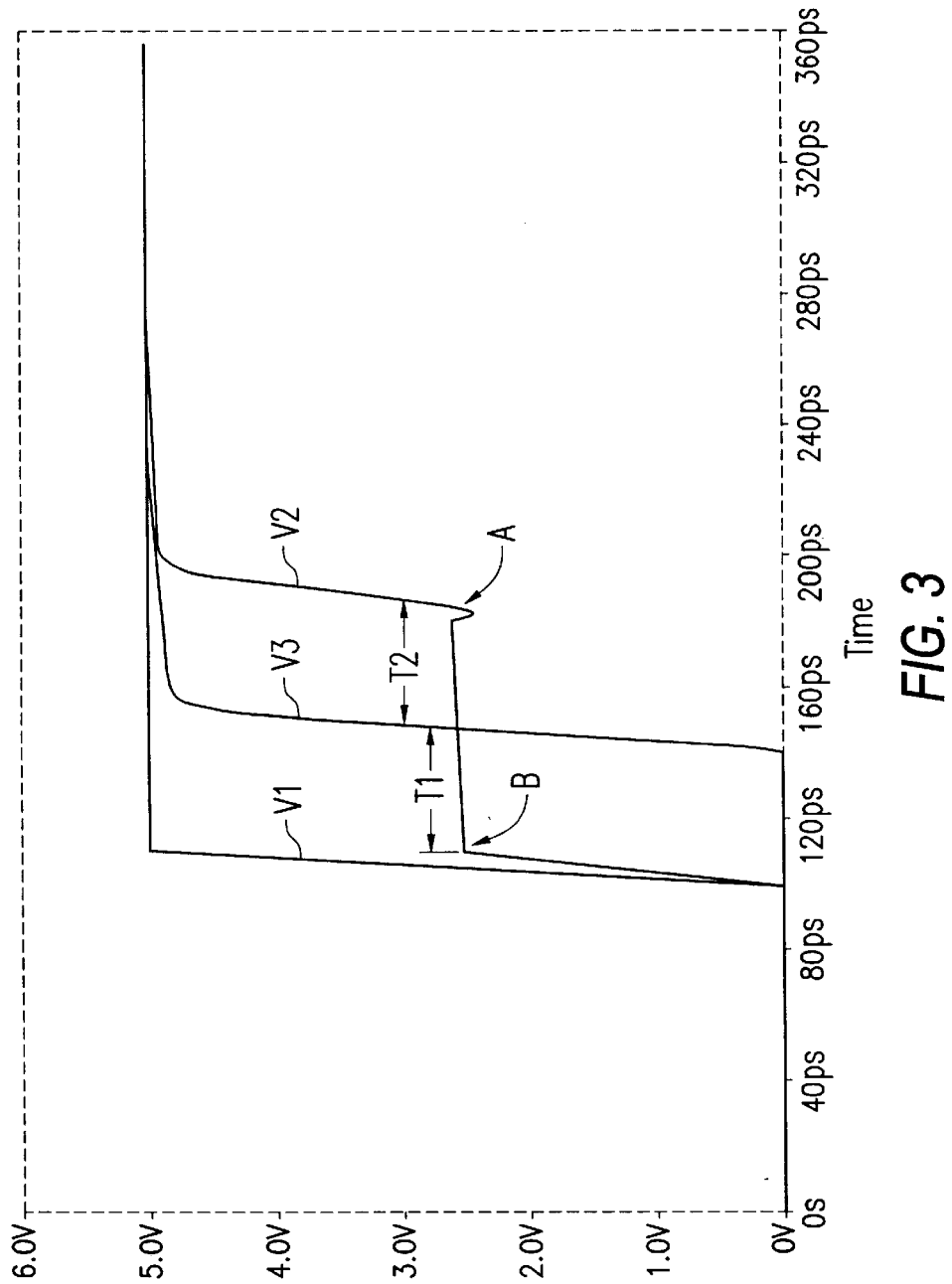
FIG. 3 is a graph illustration of a typical fast rising input signal propagated across a low loss transmission line.

One of the features of the invention is the use of a slower rising clock signal, than what is typically used (FIG. 3). A slow rising clock signal is a signal that rises to its maximum voltage in a longer period than it takes the same clock signal to travel down a low loss transmission line 6 and be reflected back.

Figure 1:
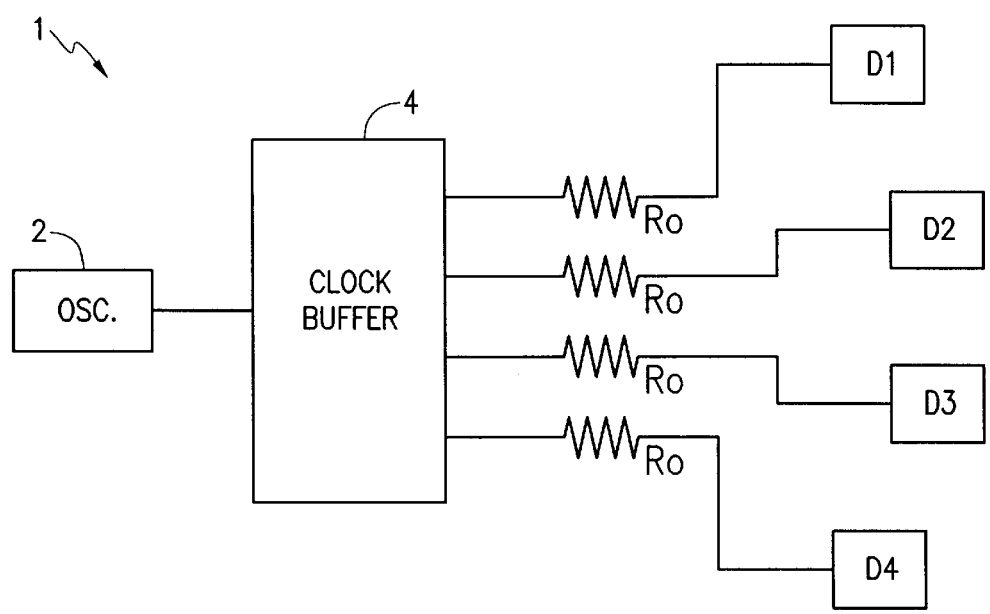
FIG. 1 is a schematic diagram of a typical clock circuit providing multiple clock signals to multiple destinations.
Figure 2:
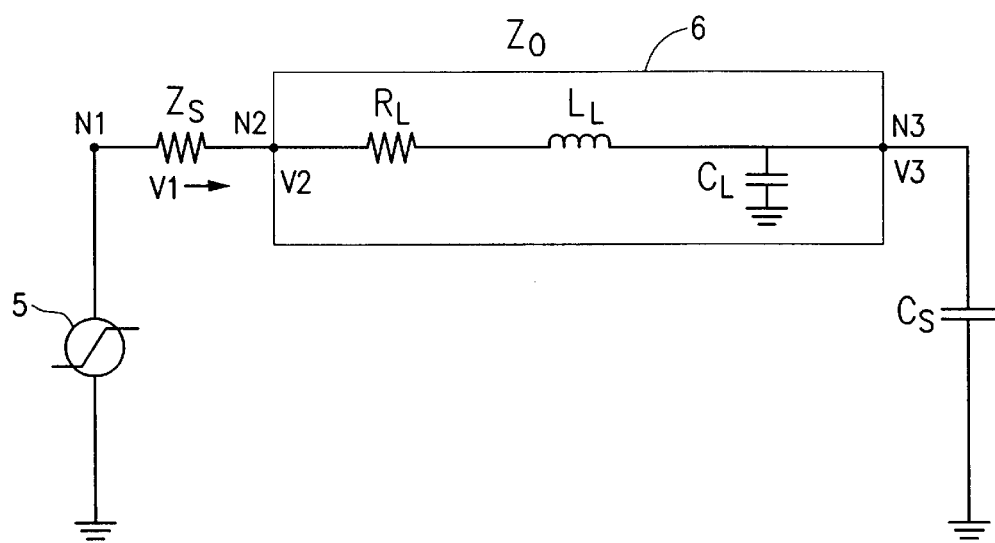
FIG. 2 is a schematic diagram of a low loss transmission line representing a typical clock signal transmission wire.
Figure 4:
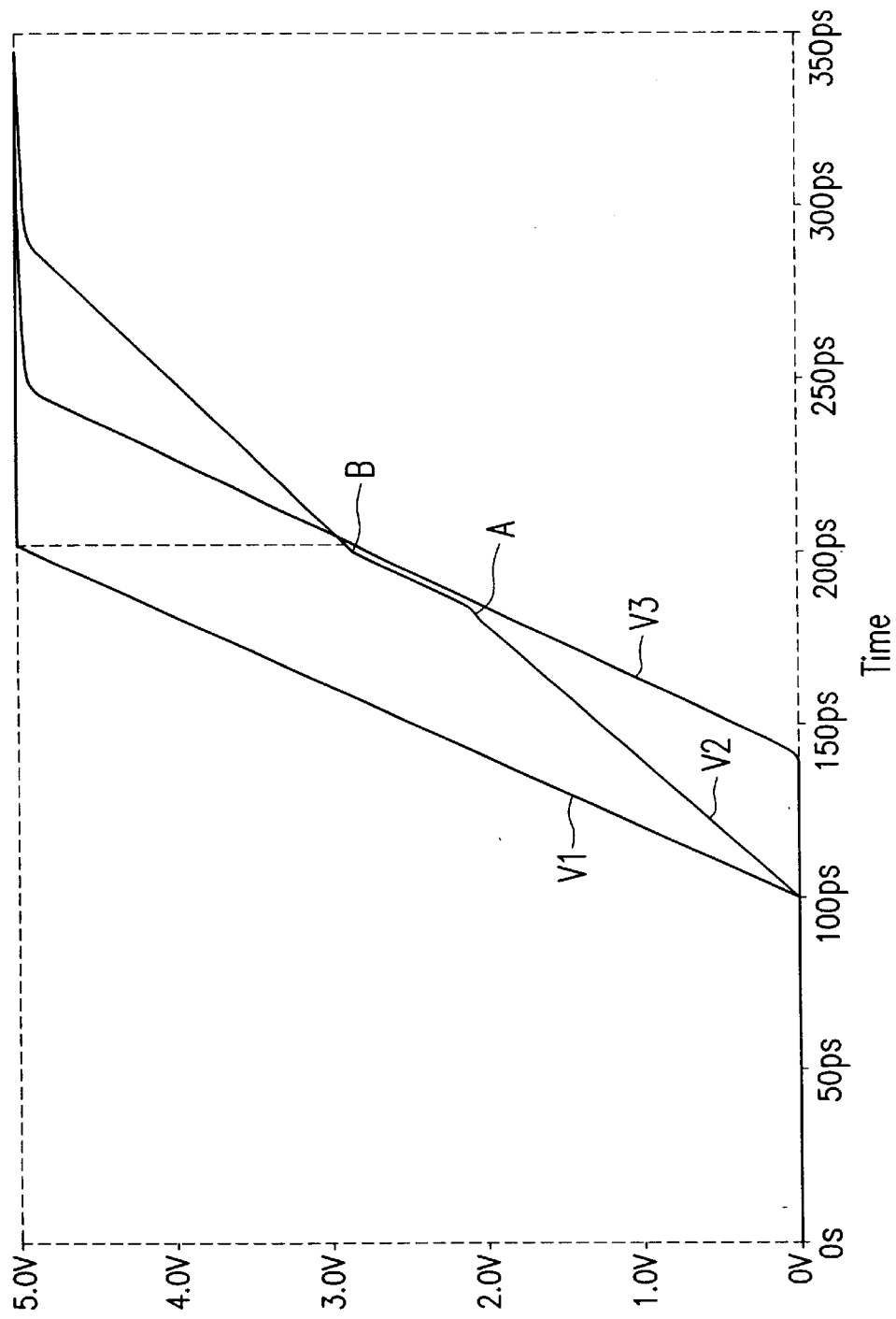
FIG. 4 is a graph illustration of a slow rising input signal propagated across a low loss transmission line.

FIG. 4, is a graphical illustration of a slow rising clock signal as launched into the FIG. 2 transmission line 6. The slow rising clock signal is shown as signal V1, the signal V2 is the signal present at node N2, and the signal V3 is the signal present at node N3. The input clock signal V1 rises at a slow rate, 0 volts to 5 volts in about 100 pico-seconds (ps). The voltage V2 rises at half the rate of V1 because the V1 signal is roughly divided in two at N2, as discussed previously. The signal V3, rises at twice the rate as V2 because the reflected signal from the small capacitance termination end is added to the incoming signal at N3. The reflected signal is sent back along the low loss transmission line 6 and adds to the voltage V2 .

Point A on the FIG. 4 graph represents the point where the reflected signal from N3 is received back at N2, causing V2 to increase. Point B on the graph represents the point in time where the source voltage V1 reaches its maximum value and stops increasing, therefore the input voltage to the transmission line V2 now only consists of the reflection still arriving back from the receiving end N3 and as a result, the rate of increase of the voltage V2 is now reduced. This continues until all reflections have returned from the receiving end N3 of the line.

Between point A and point B on the graph there is a period of time or region where there is no apparent skew or delay between the signal V2 at the sending end N2 of the low loss transmission line 6 and the signal V3 at the receiving end N3 of the low loss transmission line 6.

With reference to FIGS. 5–8, the oscillator circuit 2 and clock buffer 4 are an example of where the clock signal source might be generated. The exemplary circuits described in FIGS. 5–8 could receive clock signals from other destination sources, such as other circuits, as well. The methods and techniques employed in the exemplary circuits of FIGS. 5–8 would apply to a multitude of signals from various destination sources, including the oscillator circuit 2 and clock buffer 4.

Figure 5:
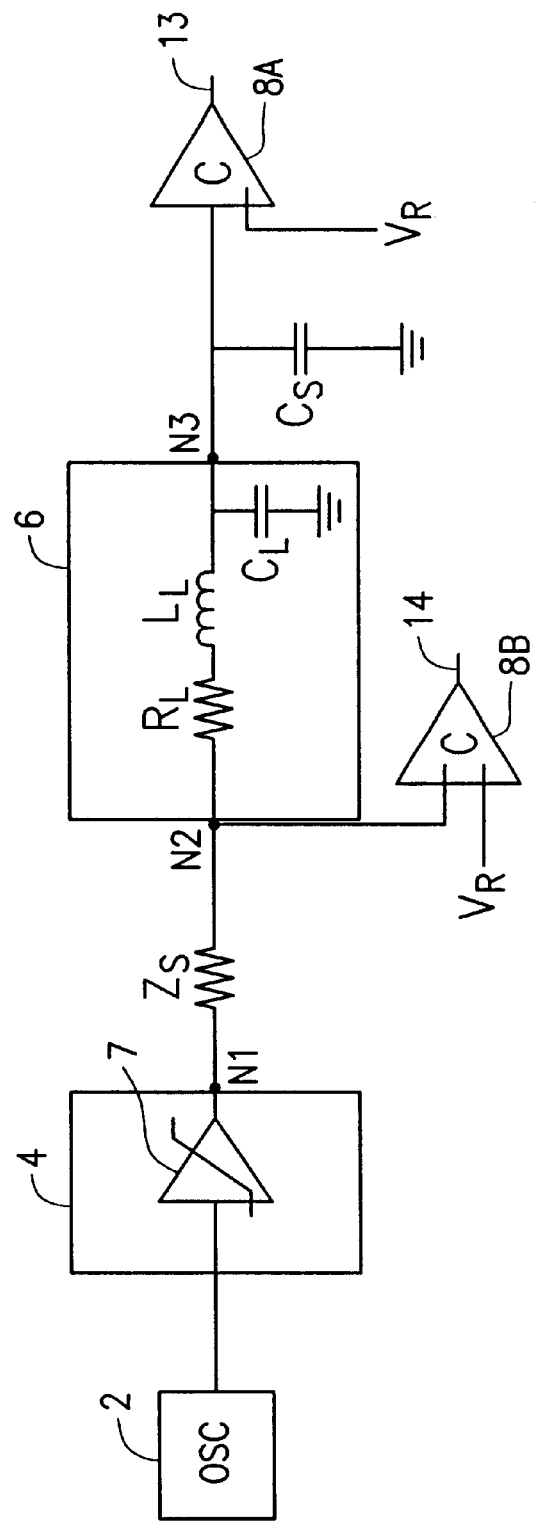
FIG. 5 is a schematic diagram of a clock signal low loss transmission circuit.

Referring to FIG. 5, a low loss transmission line 6 is coupled in a circuit with an oscillator circuit 2, a clock buffer 4 with a line driver 7, and comparators 8A, B. The comparators 8A, B are used to compare the signal at node N2 and the signal at node N3 to a fixed reference signal $V_R$. Reference signal $V_R$ is merely ½ the output voltage of the line driver 7. When the comparators 8A, B sample the signals at nodes N2 and N3 at a time when the input voltage exceeds the reference signal $V_R$ voltage, there will be no delay or skew between the timing of these sampled signals. Stated otherwise, the output signals on lines 13, 14 of the two comparators 8A, B will have little or no skew. The output signals on lines 13, 14 from the comparators 8A, B can be used as clock signals for components which need clock signals or can be used as an input to another low loss transmission line 6 for remote destination points.

Figure 6:
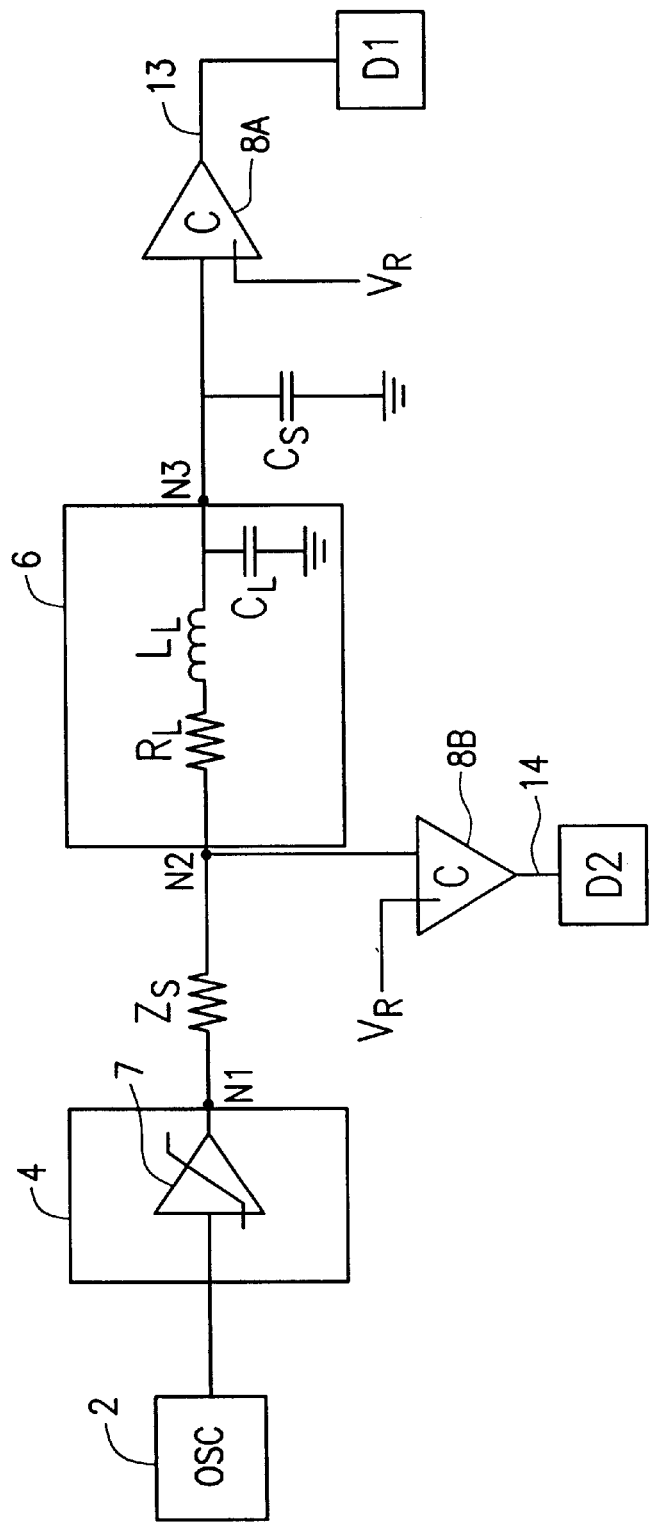
FIG. 6 is a schematic diagram of one embodiment of the present invention.

FIG. 6, depicts a schematic diagram of one embodiment of the present invention, where the end destination points D1, D2 of the clock signal are local to the comparators 8A, B. The illustrated circuit contains an oscillator circuit 2, a clock buffer 4 with a line driver 7, a low loss transmission line 6, and comparators 8A, B connected to nodes N2 and N3. The oscillator circuit 2 generates a periodic signal at a predetermined frequency. A clock buffer 4 receives the periodic signals from oscillator circuit 2 and generates a slow rising output clock signal. The line driver 7 propagates the slow rising clock signal down the low loss transmission line 6 and comparator 8A, B to destination points D1, D2. By comparing the signal at nodes N2 and N3 with the fixed reference voltage $V_R$ two signals on lines 13, 14 with substantially no skew, that is, little or no skew between them can be generated by the comparators and received by the local destination points D1, D2.

Figure 7:
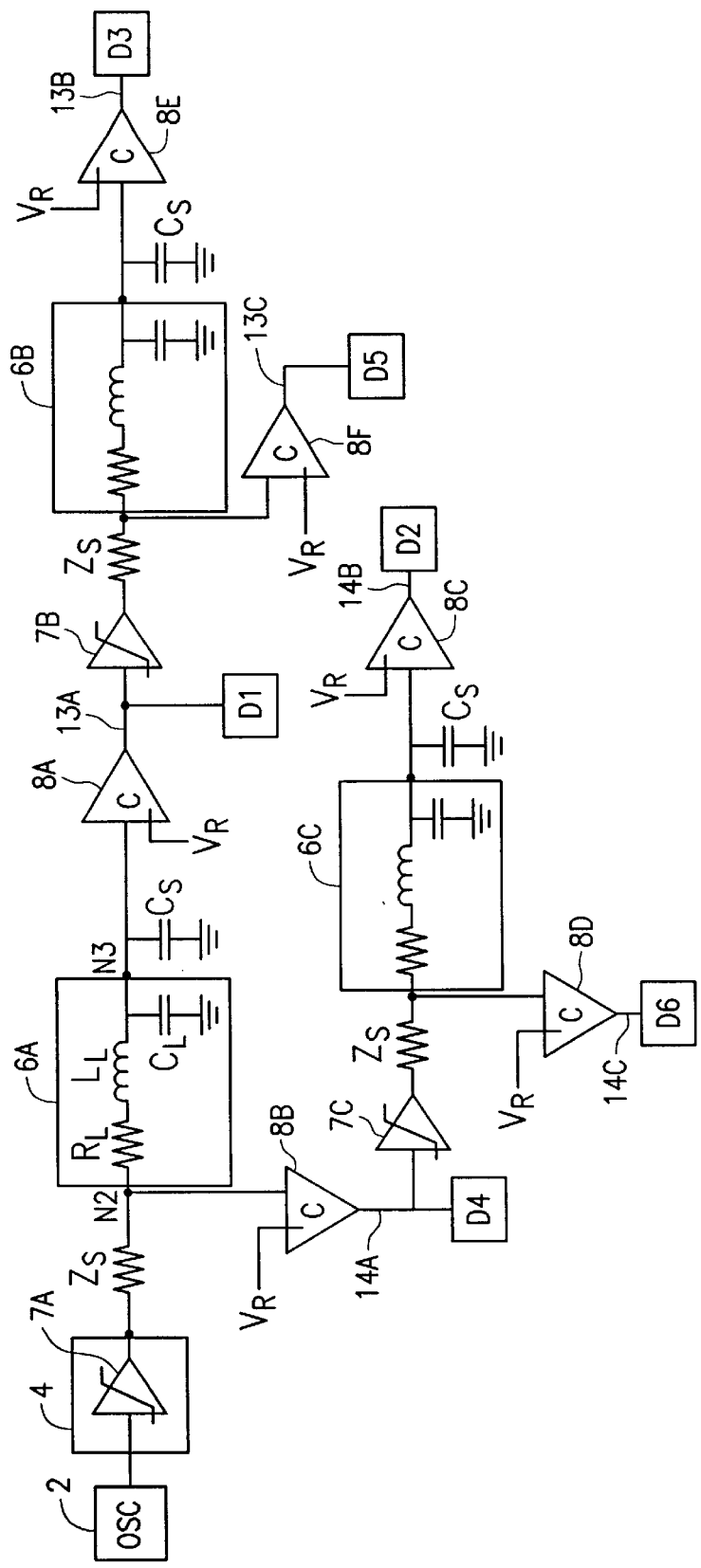
FIG. 7 is a schematic diagram of a second embodiment of the present invention.

FIG. 7, depicts a schematic diagram of another embodiment of the present invention. This circuit includes an oscillator circuit 2, a clock buffer 4, multiple line drivers 7A–C, multiple low loss transmission lines 6A–C, and multiple comparators 8A–F. The circuit diagram of FIG. 7 depicts an embodiment for generating clock signals at multiple destination points D1–D6, including locations remote from some of the comparators 8A–F. The oscillator circuit 2 generates a periodic signal at a predetermined frequency. A clock buffer 4 receives the periodic signals from oscillator circuit 2 and generates a slow rising output clock signal. The line driver 7A propagates the slow rising clock signal down the first low loss transmission line 6A. The signals at nodes N2 and N3 are sampled and compared, by comparators 8A and 8B, with the fixed reference voltage $V_R$ which produces local clock signals on lines 13A and 14A with little or no delay. Thus, if the local clock signals are taken t points D1 and D4 there will be substantially no skew between them.

Signal 13A which is sent to a destination point D1 is also used as the input to another low loss transmission line 6B. The new low loss transmission line 6B has a line driver 7B, and comparators 8E, 8F. Once again the input and termination ends of the low loss transmission line 6B are compared to $V_R$ and two signals 13B, 13C are produced which have substantially no skew and can be sent to various destination points such as D3 and D5.

Signal 14A is likewise sent to a destination point D4 and is also used at the start of another low loss transmission line 6C to reach a remote destination point D2. The low loss transmission line 6C has an associated line driver 7C and comparators 8C, 8D which produce signals 14B and 14C for locations D2 and D6 which have substantially no skew. Each new compared signal at the input and termination ends of a low loss transmission line 6A–C can be used to feed a destination point or to start a new low loss transmission line to a destination point in a different location.

Figure 8:
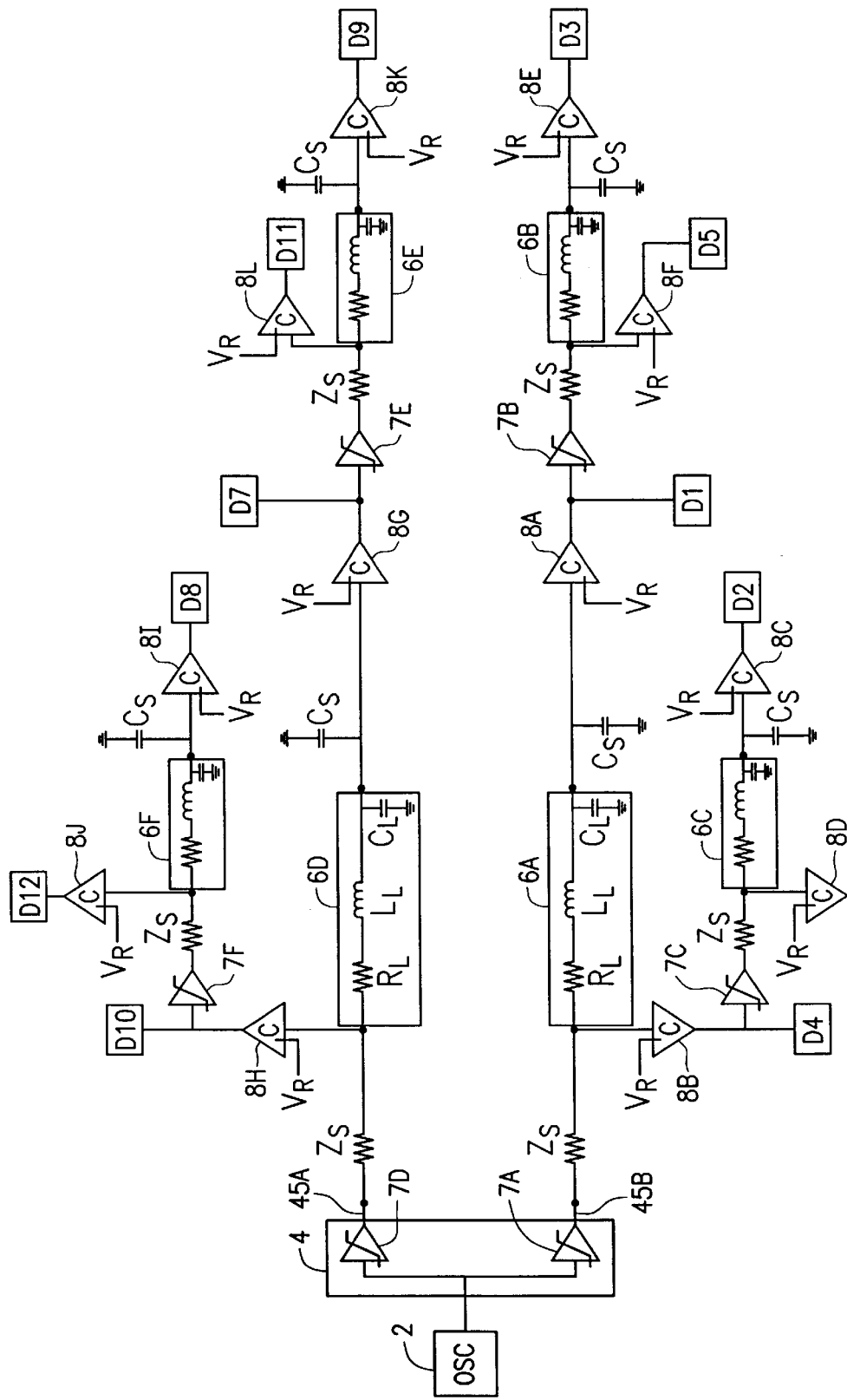
FIG. 8 is a schematic diagram of a third embodiment of the present invention.

FIG. 8, depicts a schematic diagram of another embodiment of the present invention where multiple signals are generated. The circuit of FIG. 8 contains an oscillator circuit 2, a clock buffer 4 which produces multiple clock signals 45A, B, multiple line drivers 7A–F, multiple low loss transmission lines 6A–F, and multiple comparators 8A–L. The multiple clock signals produced by the clock buffer 4 are identical in phase and power. The connections and methods for using the low loss transmission lines 6A–F are the same as discussed above. Therefore, the circuit of FIG. 8 is merely a depiction of connections and lines for sending clock signals over two parallel paths to multiple destination points D1 though D12 with little or no skew at the outputs of the comparators. provided at the input and output (e.g. nodes N2 and N3 shown in FIG. 2) of each transmission line.

When multiple low loss transmission lines are used in series, as depicted in FIGS. 7 and 8, the input and termination ends of each low loss transmission line have substantially no skew, but they are not necessarily in phase with the input and termination ends of the low loss transmission line from which it is linked. For example in FIG. 7, the clock signals at the input and termination ends of line 6A have substantially no skew and the clock signals at the input and termination ends of line 6B have substantially no skew, but the clock signals of line 6A may be skewed with respect to those of line 6B because of the transmission time through line 6B. However, this can be accounted for if all destination points require substantially non-skewed signals. Knowing that a ramped signal is required to drive the low loss transmission lines 6, the delay time on the signal travelling through next low loss transmission line would be ½ the time for the ramped signal. Therefore, the signals received at the destination ends of the first low loss transmission lines in the circuit can be delayed by a multiple of ½ the ramped signal so that all low loss transmission lines 6 in the circuit have clock signals at the input and termination ends which have substantially no skew.

Figure 9:
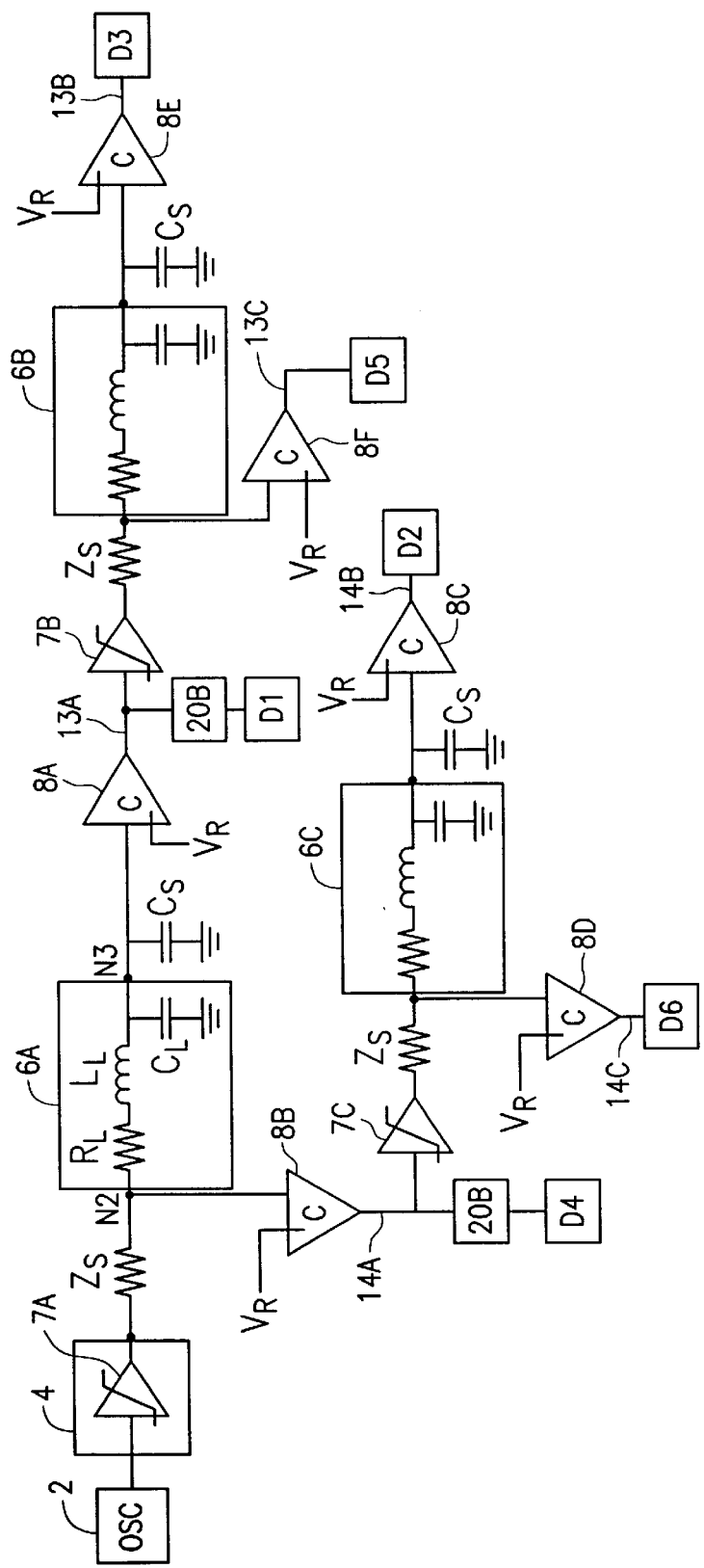
FIG. 9 is a schematic diagram of a fourth embodiment of the present invention.
Figure 10:
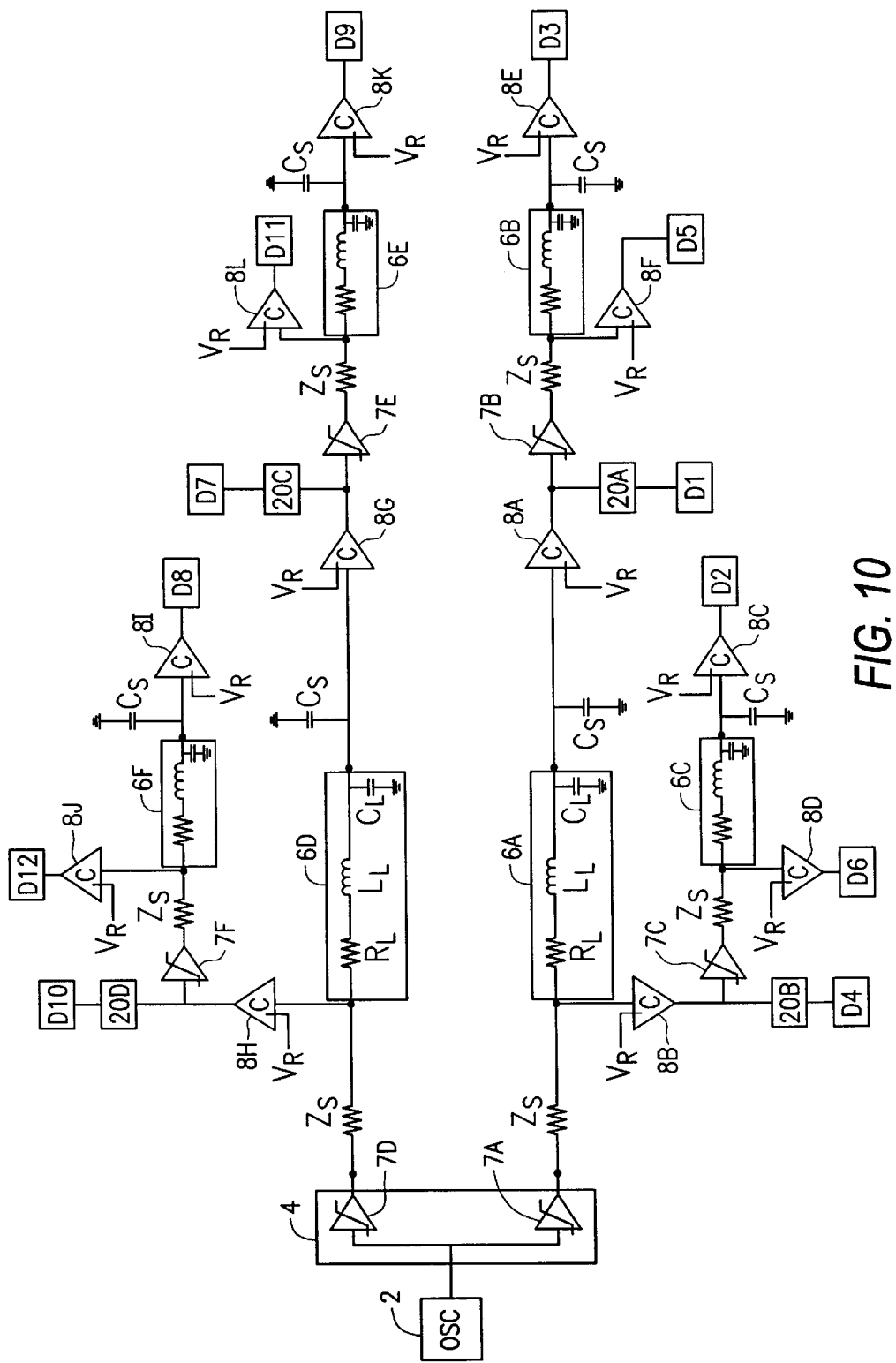
FIG. 10 is a schematic diagram of a fifth embodiment of the present invention.

FIGS. 9 and 10 are the same circuits as depicted in FIGS. 7 and 8 except that delay circuits 20A–20D are included at the output of various comparators 8A, 8B, 8H, and 8G leading to various destination points D1, D4, D7 and D10. The delay circuits 20 could be used at the end of any one of the comparators 8A–8L to provide a signal which is substantially in phase with a transmission line within the clock circuit. The delay circuits 20A–20D are typical delay circuits already well known and used in circuit design.

The embodiments depicted in FIGS. 6–10 are only exemplary of circuits which may be employed to carryout the invention. The number of destination points and locations will ultimately determine the number of signals produced by clock buffer 4, and the number of low loss transmission lines 6, line drivers 7, and comparators 8.

Figure 11:
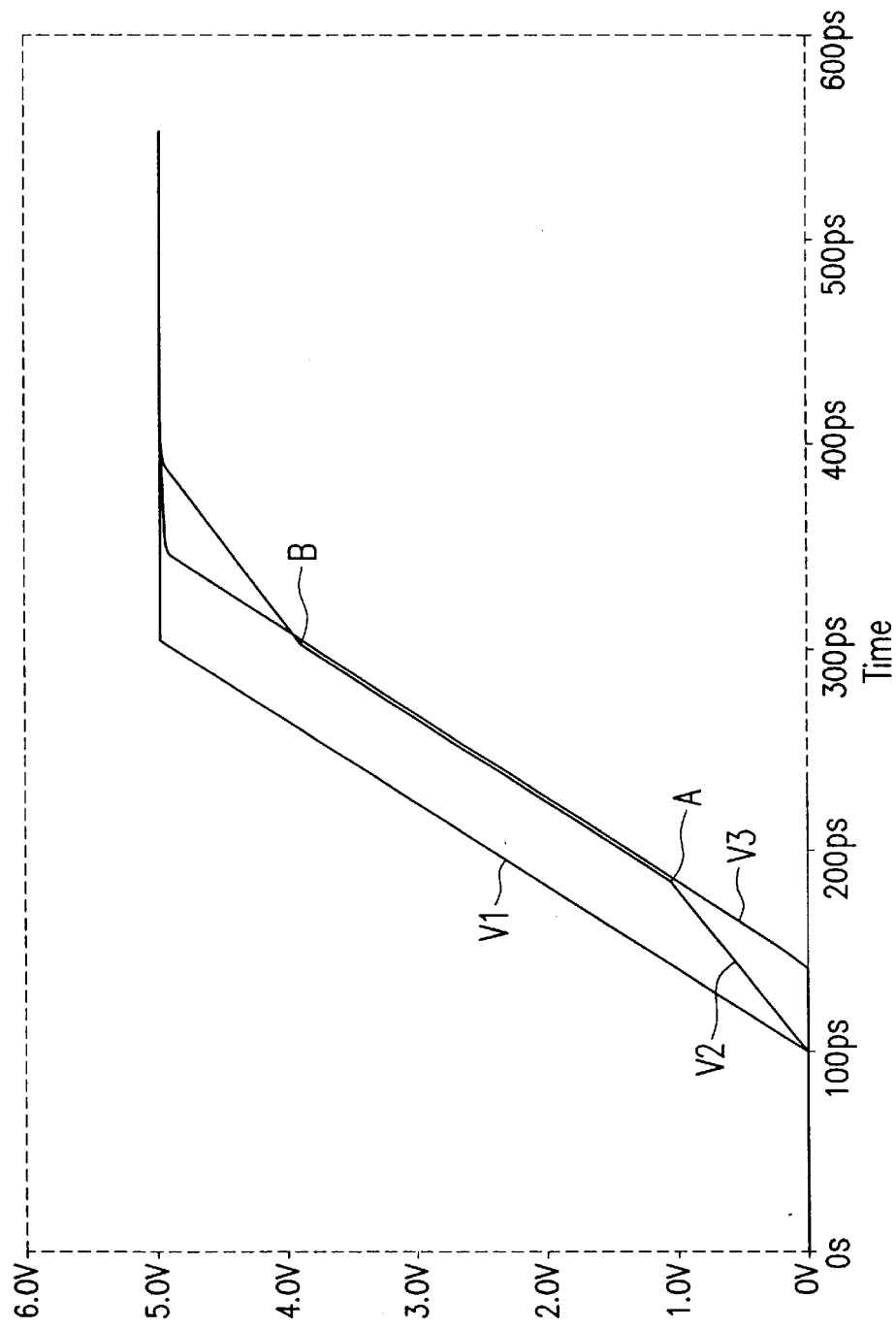
FIG. 11 is a graph illustration of a slow rising input signal propagated across a low loss transmission line which creates a larger region of no signal skew.

The rate at which the slow rising clock signal rises can also be varied. FIG. 11, is a graphical illustration of the input signal V1, the signal V2 at node N2, and the signal V3 at node N3 for an even slower rising clock signal transmitted through the circuit in FIG. 2. The input clock signal V1 rises at an even slower rate, 0 volts to 5 volts in about 200 pico-seconds (ps), as compared with the slow rising signal previously described and illustrated in FIG. 4, which to rose from 0 volts to 5 volts in 100 ps. The voltage V2 rises at half the rate of V1 because the V1 signal is divided at N2, as discussed previously. The clock signal V3, rises at twice the rate as V2 because the reflected signal from the small capacitance $C_L$ termination end is added to the incoming signal at N3. The reflected signal is sent back along the low loss transmission line 6 and the signal is added to V2. By using an even slower rising clock signal the region of no skew, between Points A an B, is even larger. Therefore, there is a larger time and voltage range for the comparator 8 to sample the signals at the input node N2 and termination node N3 of a low loss transmission line 6.

The amount of skew between the signals at the input and termination end of the low loss transmission line 6 is also affected by the characteristics of the low loss transmission line 6. These characteristics include the overall impedance of the low loss transmission line 6, the material of the line 6, and how the line 6 is constructed.

Figure 12:
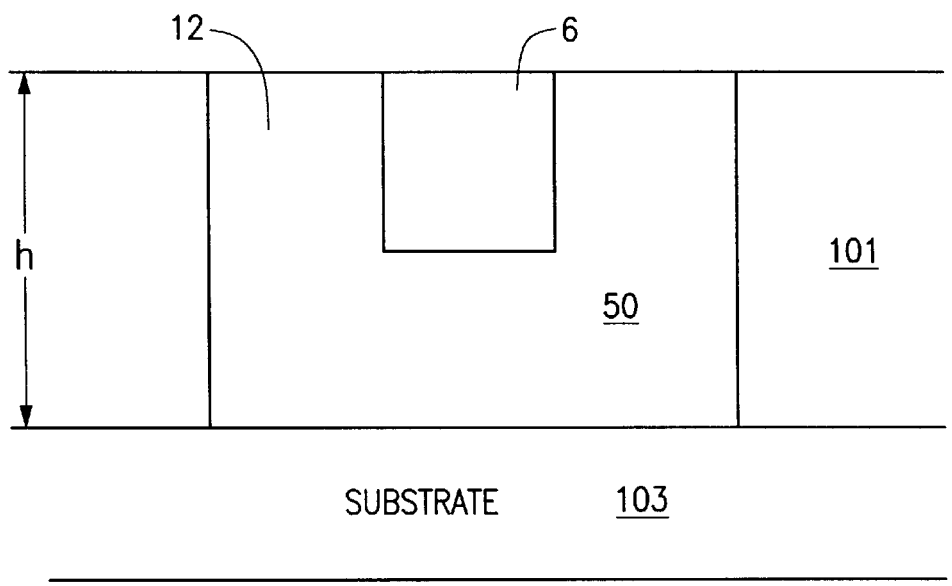
FIG. 12 is a diagram of a low loss transmission line in a line trench located in an integrated circuit.

FIG. 12, is an illustration of a typical low loss transmission line 6 and its construction. The low loss transmission line 6 is located within a trench 12, where the trench 12 is formed within an insulating layer 101 of insulating material 50, of an integrated circuit. FIG. 12 shows the layer 101 as having a substrate 103 which itself may be formed of one or more material layers. The trench 12 has a depth (h) which varies in accordance with requirements of a particular application. The low loss transmission line 6 can be supported by posts (not shown) or on insulator material 50 having a low k-dielectric constant such as oxide or porous oxide. Typical low loss transmission line and trench depth dimensions, and the ones used in determining the results of FIGS. 4 and 5, for example, are h=100 µm, with the low loss transmission line 6 had a cross section of 3.16 µm by 3.16 µm.

The technology of constructing low loss transmission lines 6 within a trench 12 of an integrated circuit are discussed in several articles from the IEEE IEDM Technical Digest of 1997 including: D. Edlestein, et al, "Full Copper Wiring in a Sub-0.25 µm CMOS ULSI Technology, p. 773–776; S. Venkatesan, et al, "A High Performance 1.8 v, 0.2 µm CMOS Technology with Copper Metalization", p. 769–772; M. Matsuura, et al, "A Highly Reliable Self-planarizing Low-k Intermetal Dielectric for Sub-quarter Micron Interconnects, p. 785–788; and H. Aoki, et al, "A Degradation-free Cu/HSQ Damascene Technology using Metal Mask Patterning and Post-CMP Cleaning by Electrolytic Ionized Water, p. 777–781 which are all incorporated herein by reference.

Figure 13:
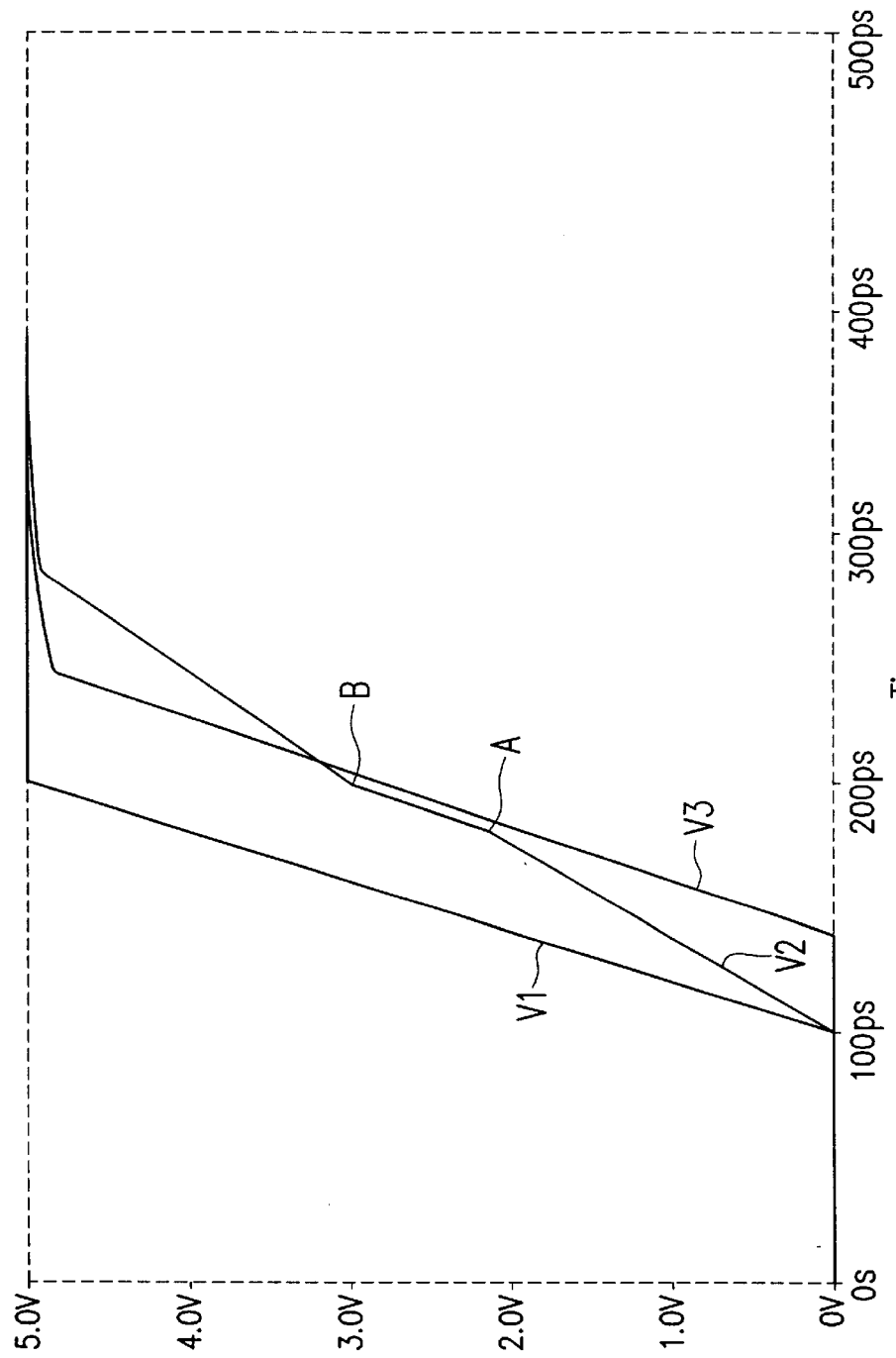
FIG. 13 is a graph showing clock signal skew for a low loss transmission line which has a lower impedance in a shallow line trench located in an integrated circuit.

FIG. 13 depicts a slow rising input clock signal V1 propagated through the low loss transmission line 6 where the low loss transmission line 6 is in a shallower trench 12, h=10 µm, and has a lower impedance, Zo=103 ohms than that describe with reference to FIGS. 4 and 12. A typical impedance of the low loss transmission line 6 is about 236 ohms, as was the case with the impedance of the low loss transmission line 6 depicted in FIG. 4. As can be seen in FIG. 11, there is a slightly larger clock signal delay or skew between V2 and V3 as compared with the skew depicted in FIG. 4.

Figure 14:
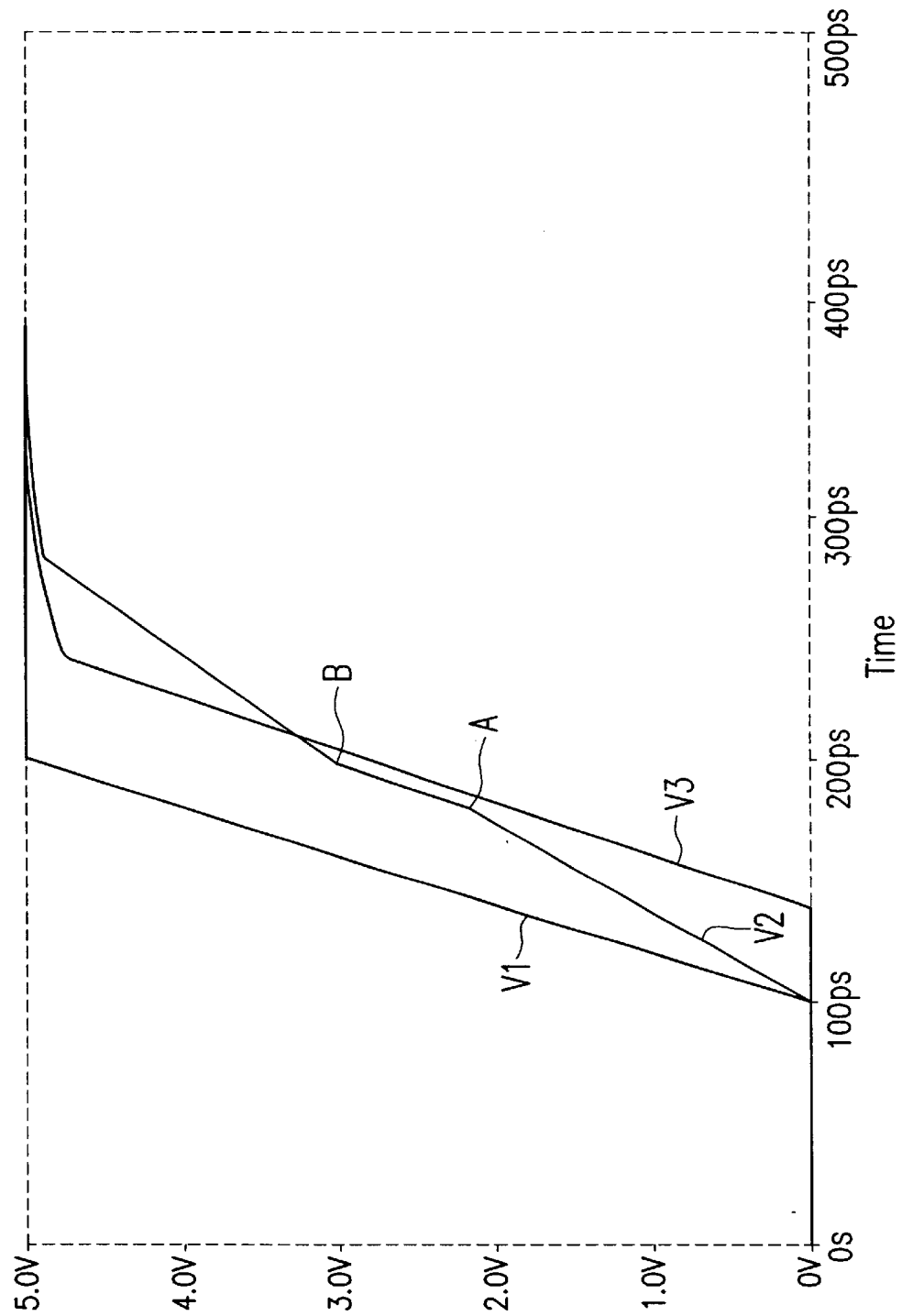
FIG. 14 is a graph showing clock signal skew for a low loss transmission line which has a much lower impedance in a much shallower line trench located in an integrated circuit.

FIG. 14, depicts a slow rising clock signal input V1 propagated through a low loss transmission line 6 with a still lower impedance, Zo=68.6 ohms and a much shallower trench 12, h=3.16 µm, as compared with the characteristics of the low loss transmission line 6 depicted in FIG. 4. The clock signal delay or clock skew between V2 and V3, of FIG. 14, as compared with the skew depicted in FIG. 4 is greater. As can be seen from FIGS. 13 and 14 the clock signal skew or delay is heavily dependant upon the low loss transmission line 6 characteristics. Therefore, to insure accurate timing the construction and characteristics of the line must be considered. Typically a low loss transmission line 6 is one where the resistance is much lower than $(4L/C)^{1/2}$, where L is the inductance and C is the capacitance of the low loss transmission line 6, $R<<(4L/C)^{1/2}$.

Figure 15:
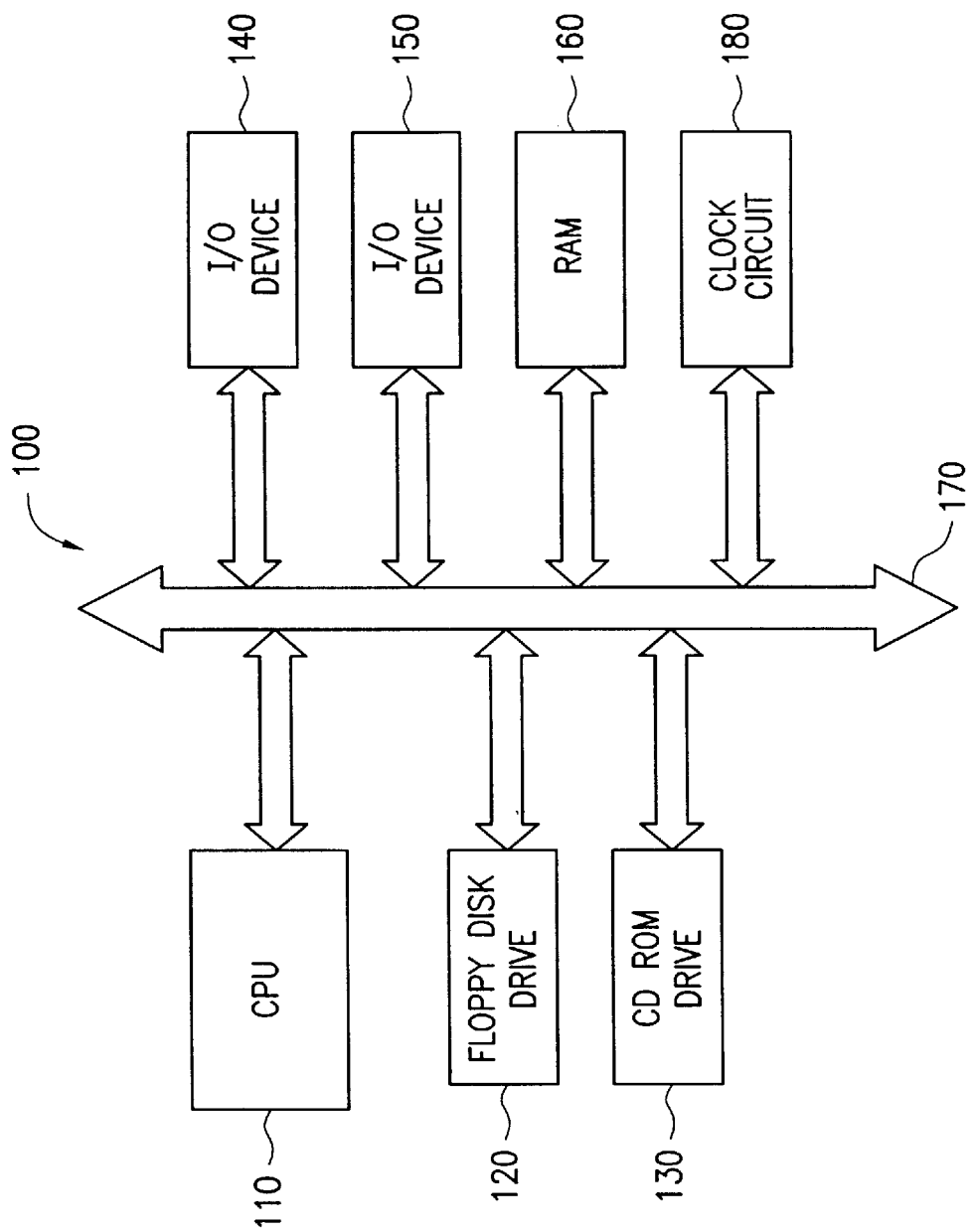
FIG. 15 illustrates in block diagram form a processor system in which a clock signal circuit device in accordance with the present invention can be used.

A typical processor based system which includes a clock circuit device 180 according to the present invention is illustrated generally at 100 in FIG. 15. The processor based system 100, such as a computer system, for example, generally comprises a central processing unit (CPU) 110, for example, a microprocessor, that communicates with one or more input/output (I/O) devices 140, 150 over a bus 170. The computer system 100 also includes random access memory (RAM) 160, and, in the case of a computer system may include peripheral devices such as a floppy disk drive 120 and a compact disk (CD) ROM drive 130 which also communicate with CPU 110 over the bus 170. RAM 160 is preferably constructed as an integrated circuit which includes multiple redundant columns having offset segmentation boundaries. It may also be desirable to integrate the processor 110 and memory 160 on a single IC chip.

Also, although the invention has been described as pertaining to reducing clock signal skew within an integrated circuit the same method, apparatus, and technique could be applied to interconnections within a printed circuit board.

The above descriptions and drawings illustrate preferred embodiments which achieve the objects, features, and advantages of the present invention. It is not intended that the present invention be limited to the illustrated embodiments. Any modifications of the present invention which comes within the spirit and scope of the following claims should be considered part of the present invention.

What is claimed as new and desired to be protected by Letters Patent of the United States is:

1. A method of operating a processor comprising:
raising a voltage at a first node of said processor to form a first clock signal;
passing said first clock signal through a transmission line to a second node of said processor, wherein said voltage rises to a maximum in a period that is longer than a time interval in which said first clock signal travels down said transmission line and is reflected back from said second node and received at said first node; and
forming a second clock signal at said second node of said processor based on said first clock signal.

2. A method of operating a processor as defined in claim 1 further comprising:
receiving said first clock signal at a first comparator coupled to said first node;
receiving said second clock signal at a second comparator coupled to said second node;
comparing said first clock signal to a standard voltage using said first comparator;
comparing said second clock signal to said standard voltage using said second comparator; and
operating first and second devices, coupled to said first and second comparators respectively, in response to respective output signals of said first and second comparators.

3. A method of operating a processor comprising:
raising a voltage of a first node of said processor to a maximum voltage during a first time interval by raising a signal voltage;
raising a voltage of a second node of said processor at a rate equivalent to a rate of rise for said raising of said voltage of said first node;
passing said signal through a transmission line coupled between said first node and said second node during a second time interval, said second time interval being larger than said first time interval, said second time interval encompassing said first time interval, said signal being responsive to said voltage of said first node; and
operating a first circuit synchronously with a second circuit in response to said voltage of said first node and said voltage of said second node respectively.

4. A method of synchronizing operation of plural electronic devices comprising:

generating an electronic signal at an electronic signal source, the electronic signal reaching a maximum voltage within a time interval;

receiving said electronic signal directly at a first electronic device;

receiving said electronic signal indirectly at a second electronic device, by way of a transmission line;

operating said first and second electronic devices concurrently responsive to said electronic signal, wherein a rate of rise is adapted to cause said electronic signal to be synchronized at said first and second devices when the voltage of said electronic signal exceeds a reference voltage.

5. A method of reducing signal skew among a plurality of output signals comprising:

producing an original clock signal;

receiving said original clock signal as a first signal at a first device;

receiving said original clock signal as said first signal at an input of a transmission line;

receiving said original clock signal as a second signal at an output of said transmission line;

said original clock signal having a rate of rise such that said original clock signal reaches a maximum voltage during a first time interval, wherein said first time interval is longer than a second time interval for receiving a reflection of said second signal at said input of said transmission line.

6. A method of reducing signal skew as defined in claim 5 wherein said transmission line comprises a waveguide.

7. A method of reducing signal skew as defined in claim 5 wherein said first and second devices comprise electronic devices.

8. A method of reducing signal skew as defined in claim 5 further comprising:

receiving said first signal at a first comparator coupled with said first device;

receiving said second signal at a second comparator coupled with said second device, said first and second comparators adapted to sense said first and second signals respectively during said time interval.

9. A method of reducing signal skew as defined in claim 8 further comprising:

comparing said first signal to a standard voltage at said first comparator;

comparing said second signal to said standard voltage at said second comparator; and controlling operation of said first and second devices by said first and second comparators respectively.

10. A method of reducing signal skew as defined in claim 9 wherein said standard voltage comprises a voltage equal to half a voltage range of said original clock signal.

11. A method of reducing signal skew as defined in claim 5 wherein said transmission line has a characteristic impedance greater than 50 Ohms.

12. The method as defined in claim 5 wherein said maximum voltage is a circuit operating voltage.

13. The method as defined in claim 5 wherein said first time interval is greater than 80 picoseconds.

14. The method as defined in claim 13 wherein said first time interval is about 200 picoseconds.

15. The method as defined in claim 13 wherein said first time interval is about 100 picoseconds.

16. A method of communicating a signal for coordinating concurrent action by devices comprising:

applying a signal to a first device disposed at a first end of a transmission line;

transmitting said signal through said transmission line;

receiving said signal at a second device disposed at a second end of said transmission line and coupled to said second end of said transmission line; and operating said first and second devices responsive to said signal, wherein said signal rises to a maximum voltage in a period that is longer than a time interval in which said signal is transmitted through said transmission line and is reflected back from said second end of said transmission line and received at said first end of said transmission line.

17. A method of communicating a signal for coordinating concurrent action by devices as defined in claim 16 wherein said signal comprises a monotonic voltage transition.

18. A method of timing an operation of an electronic system comprising:

transmitting a signal from a signal source to a first device, said signal rising to a maximum voltage within predetermined first time interval;

transmitting said signal from said first device to a second device along a waveguide;

operating said first device and said second device synchronously in response to receiving said signal at said first device and said second device, wherein the first time interval for said signal to rise to a maximum voltage is longer than a time interval for said signal to traverse said waveguide and be reflected back to a node coupling said first device to said waveguide.

19. A circuit comprising:

a first device coupled to a first end of a signaling medium;

a second device coupled to a second end of said signaling medium;

means for transmitting a signal to said first device and through said signaling medium to said second device, wherein a period for said signal to rise to a maximum voltage is longer than a period for said signal to traverse said signaling medium and be reflected back to said first end of said signaling medium to produce substantially equal signal levels at said first and second electronic devices during a sensing time interval.

20. A circuit as defined in claim 19 wherein said signaling medium comprises a transmission line.

21. A circuit as defined in claim 20 wherein said transmission line comprises a strip line transmission line.

22. A circuit as defined in claim 20 wherein first and second devices comprise first and second electronic devices.

23. A circuit as defined in claim 19 wherein said signaling medium comprises a waveguide.

24. A circuit as defined in claim 23 wherein said waveguide comprises an optical waveguide.

25. A circuit as defined in claim 24 wherein said first and second devices comprise first and second optical devices.

26. A circuit as defined in claim 19 wherein said circuit comprises a microprocessor.

27. A circuit as defined in claim 19 wherein said circuit comprises a memory integrated circuit.

* * * * *